US010850871B2

(12) United States Patent
Agathon-Burton et al.

(10) Patent No.: US 10,850,871 B2
(45) Date of Patent: Dec. 1, 2020

(54) ELECTROSTATIC DISCHARGE MITIGATION FOR A FIRST SPACECRAFT OPERATING IN PROXIMITY TO A SECOND SPACECRAFT

(71) Applicant: Northrop Grumman Innovation Systems, Inc., Plymouth, MN (US)

(72) Inventors: Christine A. Agathon-Burton, Bethesda, MD (US); Matthew Alan Michel, Oak Hill, VA (US); Dewey Edwin Cochran, Arlington, VA (US); Ronald Lynn Graham, Herndon, VA (US); Gregg A. Herbert, Waterford, VA (US); William A. Llorens, Herndon, VA (US)

(73) Assignee: Northrop Grumman Innovation Systems, Inc., Plymouth, MN (US)

( * ) Notice: Subject to any disclaimer, the term of this patent is extended or adjusted under 35 U.S.C. 154(b) by 312 days.

(21) Appl. No.: 15/829,758

(22) Filed: Dec. 1, 2017

(65) Prior Publication Data

US 2018/0297722 A1    Oct. 18, 2018

Related U.S. Application Data

(60) Provisional application No. 62/484,969, filed on Apr. 13, 2017.

(51) Int. Cl.
*B64G 1/52*      (2006.01)
*B64G 1/64*      (2006.01)
(Continued)

(52) U.S. Cl.
CPC .............. *B64G 1/52* (2013.01); *B64G 1/405* (2013.01); *B64G 1/646* (2013.01); *B64G 1/1078* (2013.01)

(58) Field of Classification Search
CPC ........... B64G 1/52; B64G 1/405; B64G 1/646
See application file for complete search history.

(56) References Cited

U.S. PATENT DOCUMENTS

| 7,070,151 B2 * | 7/2006 | D'Ausilio | .............. | B64G 1/007 |
| | | | | 244/171.1 |
| 7,216,833 B2 * | 5/2007 | D'Ausilio | .............. | B64G 1/007 |
| | | | | 244/171.1 |

(Continued)

FOREIGN PATENT DOCUMENTS

| JP | 06340298 | 12/1994 |
| JP | 07165198 | 6/1995 |

(Continued)

OTHER PUBLICATIONS

International Search Report for International Application No. PCT/US2018/017852, dated May 24, 2018, 5 pages.

(Continued)

*Primary Examiner* — Philip J Bonzell
*Assistant Examiner* — Tye William Abell
(74) *Attorney, Agent, or Firm* — Phillips Winchester

(57) ABSTRACT

Methods and systems for mitigating or reducing the risk of an electrostatic discharge due to static charge differentials between a first spacecraft and a second spacecraft as the first spacecraft approaches the second spacecraft may be accomplished using a passive electrostatic discharge mitigation device. In some embodiments, mitigation of static potential between the first spacecraft and the second spacecraft may be actively accomplished by an electric propulsion system provided on the first spacecraft. In some embodiments, mitigation may be provided by both actively and passively mitigating static potential between the first spacecraft and the second spacecraft.

20 Claims, 9 Drawing Sheets

(51) Int. Cl.
*B64G 1/40* (2006.01)
*B64G 1/10* (2006.01)

(56) References Cited

U.S. PATENT DOCUMENTS

| | | | | |
|---|---|---|---|---|
| 7,216,834 | B2 * | 5/2007 | D'Ausilio | B64G 1/007 |
| | | | | 244/172.5 |
| 7,461,818 | B2 | 12/2008 | D'Ausilio et al. | |
| 7,484,690 | B2 * | 2/2009 | D'Ausilio | B64G 1/007 |
| | | | | 244/171.1 |
| 7,575,199 | B2 | 8/2009 | D'Ausilio et al. | |
| 7,588,213 | B2 | 9/2009 | D'Ausilio et al. | |
| 7,611,096 | B2 | 11/2009 | D'Ausilio et al. | |
| 7,611,097 | B2 | 11/2009 | D'Ausilio et al. | |
| 7,624,950 | B2 | 12/2009 | D'Ausilio et al. | |
| 8,205,838 | B2 * | 6/2012 | Moorer, Jr. | B64G 1/007 |
| | | | | 244/158.4 |
| 2014/0240887 | A1 * | 8/2014 | Canham | B64G 1/52 |
| | | | | 361/215 |

FOREIGN PATENT DOCUMENTS

| | | | | |
|---|---|---|---|---|
| JP | 07165198 A | * | 6/1995 | B64G 1/646 |
| JP | 08i30097 | | 5/1996 | |
| JP | 08130097 A | * | 5/1996 | B64G 1/54 |

OTHER PUBLICATIONS

Written Opinion of the International Search Authority for International Application No. PCT/US2018/017852, dated May 24, 2018, 7 pages.

* cited by examiner

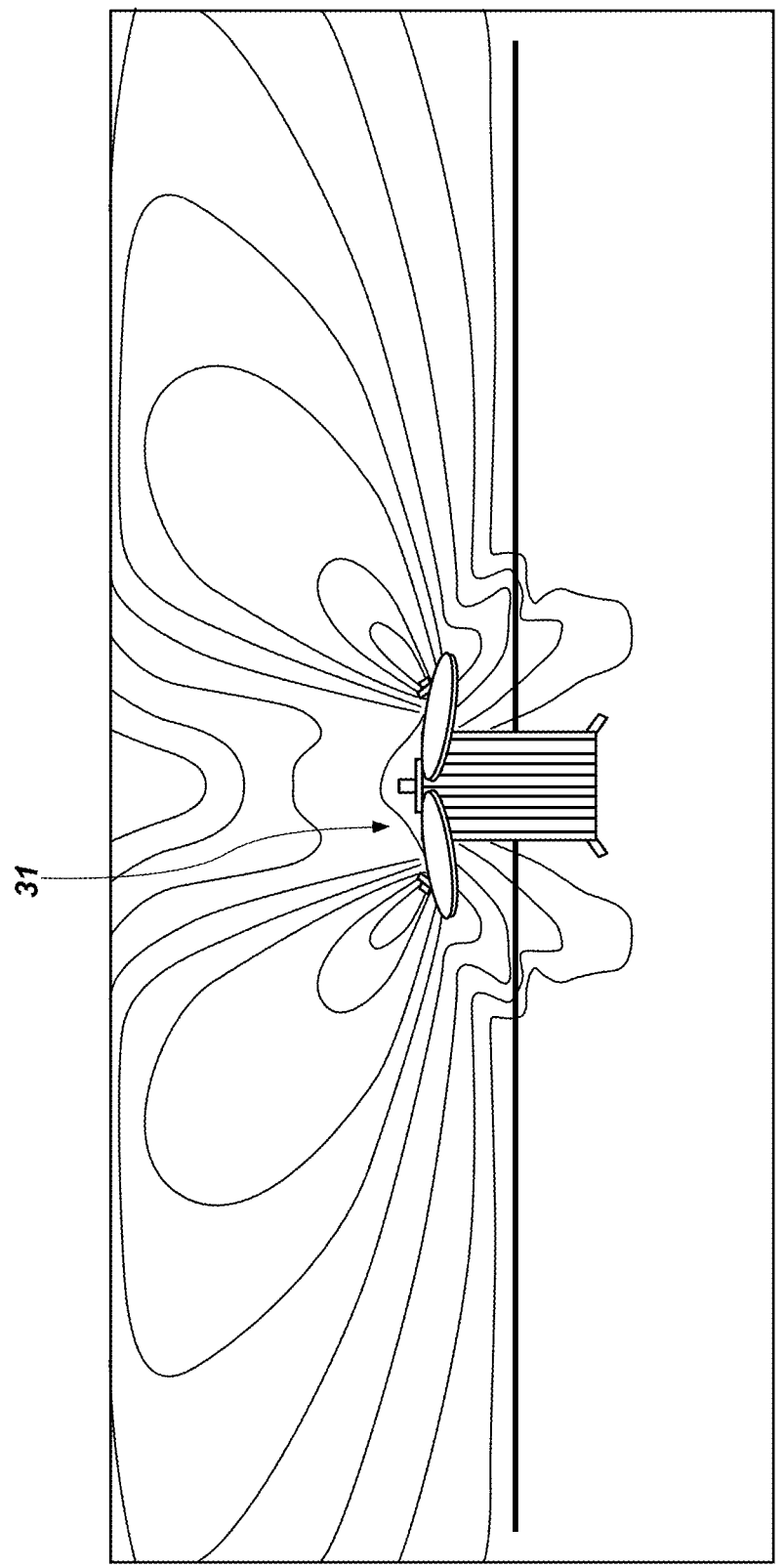

ELECTROSTATIC DISCHARGE MITIGATION FOR A FIRST SPACECRAFT OPERATING IN PROXIMITY TO A SECOND SPACECRAFT

CROSS-REFERENCE TO RELATED APPLICATION

This application claims the benefit under 35 U.S.C. § 119(e) of U.S. Provisional Patent Application Ser. No. 62/484,969, filed Apr. 13, 2017, the disclosure of which is hereby incorporated herein in its entirety by this reference.

FIELD

The present disclosure relates systems and methods for addressing the challenges that arise with regard to electrostatic discharge when a first spacecraft is operating in proximity with a second spacecraft, and particularly when the first spacecraft approaches the second spacecraft to dock or otherwise contact the second spacecraft.

BACKGROUND

Thousands of spacecraft orbit the Earth for performing various functions including, for example, telecommunication, GPS navigation, weather forecasting, and mapping. More complex large spacecraft are also in orbit, including the International Space Station, to which nations throughout the world send crew and supplies for scientific investigation and research. However, spacecraft periodically require servicing to extend their functioning life span. Servicing may include, for example, component repair, refueling, orbit raising, station-keeping, momentum balancing, or other maintenance. Without life extension maintenance, these spacecraft may fall out of service, and replacement is generally extraordinarily expensive and can have a lead time of years. In the case of unmanned spacecraft, to accomplish such servicing, a servicing spacecraft may be sent into orbit to dock with a client spacecraft requiring maintenance, and subsequent to docking, perform life-extending maintenance on the client.

However, spacecraft or other bodies in orbit often possess different electrical potentials. When two spacecraft approach each other, a significant risk arises that an electrostatic discharge could occur between the two spacecraft. Spacecraft contain numerous electronic systems that could be damaged or destroyed by such an electrostatic discharge event. Various patents and publications have considered how to mitigate the risk of an electrostatic discharge event, including U.S. Pat. Nos. 7,070,151, 7,216,833, 7,216,834, 7,461,818, 7,484,690, 7,575,199, 7,588,213, 7,611,096, 7,611,097, 7,624,950, and 8,205,838, the disclosure of each of which is hereby incorporated herein in its entirety by this reference. However, an improved system and method for mitigating electrostatic discharge between a first spacecraft and a second spacecraft is desirable.

BRIEF SUMMARY

Methods and systems for mitigating the risk of an electrostatic discharge due to static charge differentials between a first spacecraft and a second spacecraft are disclosed herein. Various embodiments teach a passive electrostatic discharge mitigation device facilitating the safe reduction of static potential between the first and second spacecraft prior to and/or upon contact. Some embodiments provide an apparatus to direct the flow of a static discharge current in a manner that minimizes risk to the electronic components of the first and second spacecraft, which may be accomplished by providing one or more whiskers electrically connected to a passive electrostatic discharge mitigation device. Some embodiments provide for actively mitigating static potential between a first spacecraft and a second spacecraft by means of an electric propulsion system provided on the first spacecraft. Some embodiments provide for both actively and passively mitigating static potential between the first spacecraft and the second spacecraft.

Certain embodiments teach a system and method for mitigating electrostatic discharge between a first space vehicle and a second space vehicle comprising a passive electrostatic discharge mitigation system situated on the first space vehicle, wherein the passive electrostatic discharge mitigation system comprises one or more resistors and wherein the passive electrostatic discharge mitigation system comprises one or more ferrite beads. In some embodiments, the passive electrostatic discharge mitigation system reduces an electrostatic discharge current between the first space vehicle and the second space vehicle to less than or equal to about 800 milliamps over a time period of less than or equal to about 90 nanoseconds. Some embodiments further comprise one or more whiskers as part of the passive electrostatic discharge mitigation system.

Certain embodiments teach a system and method for mitigating electrostatic discharge between a first space vehicle and a second space vehicle comprising an active electrostatic discharge system situated on the first space vehicle, wherein the active electrostatic discharge system manipulates a plasma field. In various embodiments, the manipulated plasma field is the plasma field of the first space vehicle, the plasma field of the second space vehicle, or the plasma fields of both the first and second space vehicles. The active electrostatic discharge system may manipulate the plasma field using an electric propulsion apparatus. Some embodiments provide that the electric propulsion apparatus produce a plasma field significant enough to reduce the potential between the first space vehicle and the second space vehicle to less than about +/−200 volts. The electric propulsion apparatus may be one or more Hall Effect Thrusters.

Certain embodiments teach a system and method for mitigating electrostatic discharge between a first space vehicle and a second space vehicle, comprising a propulsion mechanism for maneuvering the first space vehicle in space; a capture mechanism positioned on the first space vehicle for at least temporarily joining the first space vehicle to the second space vehicle; and a mechanism for passively mitigating electrostatic discharge. The mechanism for passively mitigating electrostatic discharge may include one or more compliant members, which in some embodiments may be one or more whiskers. In some embodiments, the compliant member provides the first physical contact between the first space vehicle and the second space vehicle. The compliant member may contact an engine of the second space vehicle and, in some embodiments, the compliant member always contacts the engine before any other physical structure on the second space vehicle. The engine of the second space vehicle may be a liquid apogee engine. According to some embodiments, the capture mechanism includes a probe. The compliant member may be positioned on the probe. Some embodiments provide that the compliant member extends from the first space vehicle in a direction toward the second space vehicle. The compliant member may be highly compliant. In some embodiments, the compliance of the compliant member is provided in part by a torsion spring. According to some embodiments, the compliant member is comprised of beryllium copper.

Certain embodiments teach a system and method for mitigating electrostatic discharge between a first space vehicle and a second space vehicle comprising a passive electrostatic discharge mitigation system situated on the first space vehicle; and an active electrostatic discharge system situated on the first space vehicle. In some embodiments, the passive electrostatic discharge mitigation system comprises one or more resistors and wherein the passive electrostatic discharge mitigation system comprises one or more ferrite beads. In some embodiments, the active electrostatic discharge system manipulates a plasma field. The passive electrostatic discharge mitigation system may reduce an electrostatic discharge current between the first space vehicle and the second space vehicle to less than or equal to about 800 milliamps over a time period of less than or equal to about 90 nanoseconds. The system further may include a whisker or a plurality of whiskers. The whisker may provide the first physical contact between the first space vehicle and the second space vehicle, and may contact an engine of the second space vehicle. The whisker may extend from the first space vehicle in a direction toward the second space vehicle. In some embodiments, the whisker always contacts the engine before any other physical structure on the second space vehicle. The capture mechanism may include a probe, and the whisker may be positioned on the probe in some embodiments. The whisker may be highly compliant and, in some embodiments, the compliance is provided in part by a torsion spring. In some embodiments, the whisker is comprised of beryllium copper. In some embodiments, the manipulated plasma field is the plasma field of the first space vehicle, the plasma field of the second space vehicle, or the plasma fields of both the first and second space vehicles. The active electrostatic discharge system may manipulate the plasma field using an electric propulsion apparatus, which may be one or more Hall Effect Thrusters in some embodiments. The electric propulsion apparatus may produce a plasma field significant enough to reduce the potential between the first space vehicle and the second space vehicle to less than about +/−200 volts.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIGS. 9A and 9B are graphical representations of the operation of an active electrostatic discharge mitigation system to create plasma, according to one or more embodiments.

Figure 1:
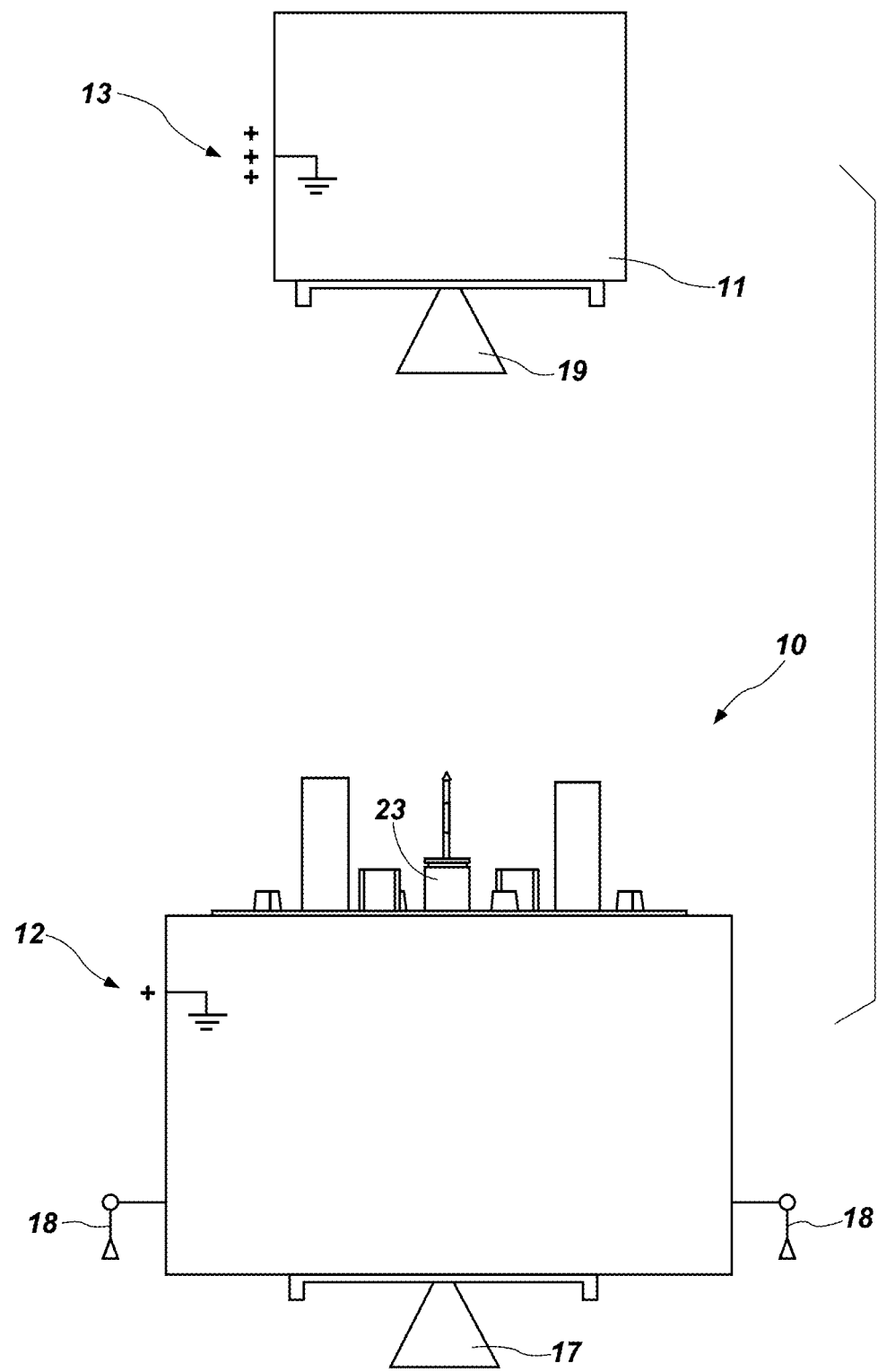
FIG. 1 is a side elevational view of a first spacecraft and a second spacecraft in proximity, according to one or more embodiments.

Although embodiments of the disclosure disclosed herein are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure.

DETAILED DESCRIPTION

As used herein, the term "substantially" in reference to a given parameter means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

The inventors have recognized the risk of damage from electrostatic discharges due to static charge differentials associated with an approach of a first spacecraft to a second spacecraft. In some embodiments, the first spacecraft may comprise a capture assembly that beneficially provides electrostatic mitigation to protect electronic components in the first spacecraft, the second spacecraft, or both. Some embodiments provide systems and methods for reducing the static potential between a first and second spacecraft in a manner that protects the components of both spacecraft.

FIG. 1 is a side elevation view of two spacecraft in proximity in space according to one embodiment. In some embodiments, first spacecraft 10 may be designed to dock to second spacecraft 11. First spacecraft 10 may be a servicer spacecraft designed to provide service to second spacecraft 11. According to some embodiments, second spacecraft 11 may be a satellite in orbit around a body such as the Earth. If second spacecraft 11 is in orbit around Earth, second spacecraft 11 may be in low or medium Earth orbit, geosynchronous or above-geosynchronous orbit, or any other orbit.

First spacecraft 10 may have a capture apparatus 23 with a probe and a propulsion system. The propulsion system of first spacecraft 10 may include one or more main thrusters 17, one or more gimbaled thrusters 18, or both. Main thruster 17, gimbaled thrusters 18, or both may be electric propulsion apparatuses. Second spacecraft 11 may have an engine 19. Engine 19 can be any type of suitable engine or motor for a spacecraft, including a liquid apogee engine or a solid fuel motor. First spacecraft 10 may have a first static potential 12, and second spacecraft 11 may have a second static potential 13. Upon approach or contact of first spacecraft 10 to second spacecraft 11, a differential between first static potential 12 and second static potential 13 may cause an electrostatic discharge. Such an electrostatic discharge may cause damage to first spacecraft 10, second spacecraft 11, or both, unless the differential between first static potential 12 and second static potential 13 is mitigated.

Figure 2:
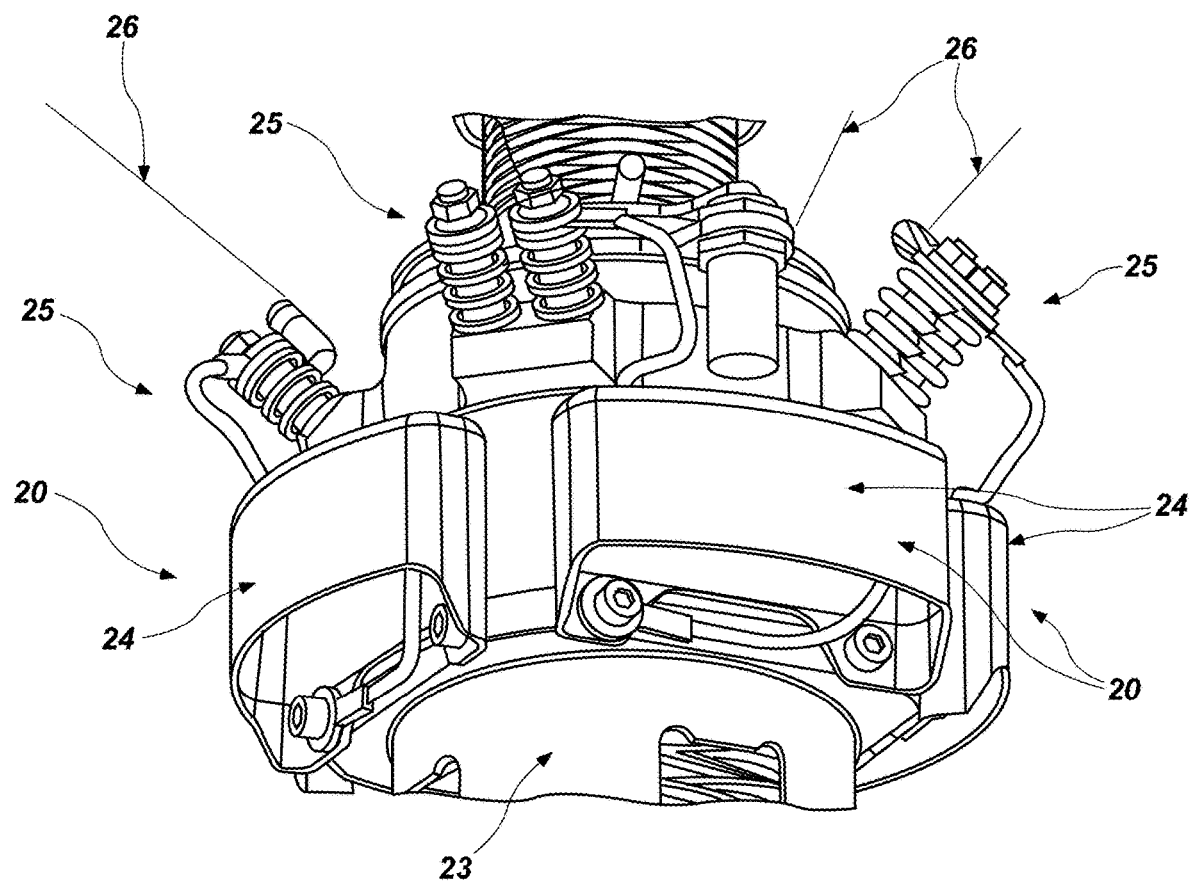
FIG. 2 is a perspective diagram of a passive electrostatic discharge mitigation system, according to one or more embodiments.
Figure 3:
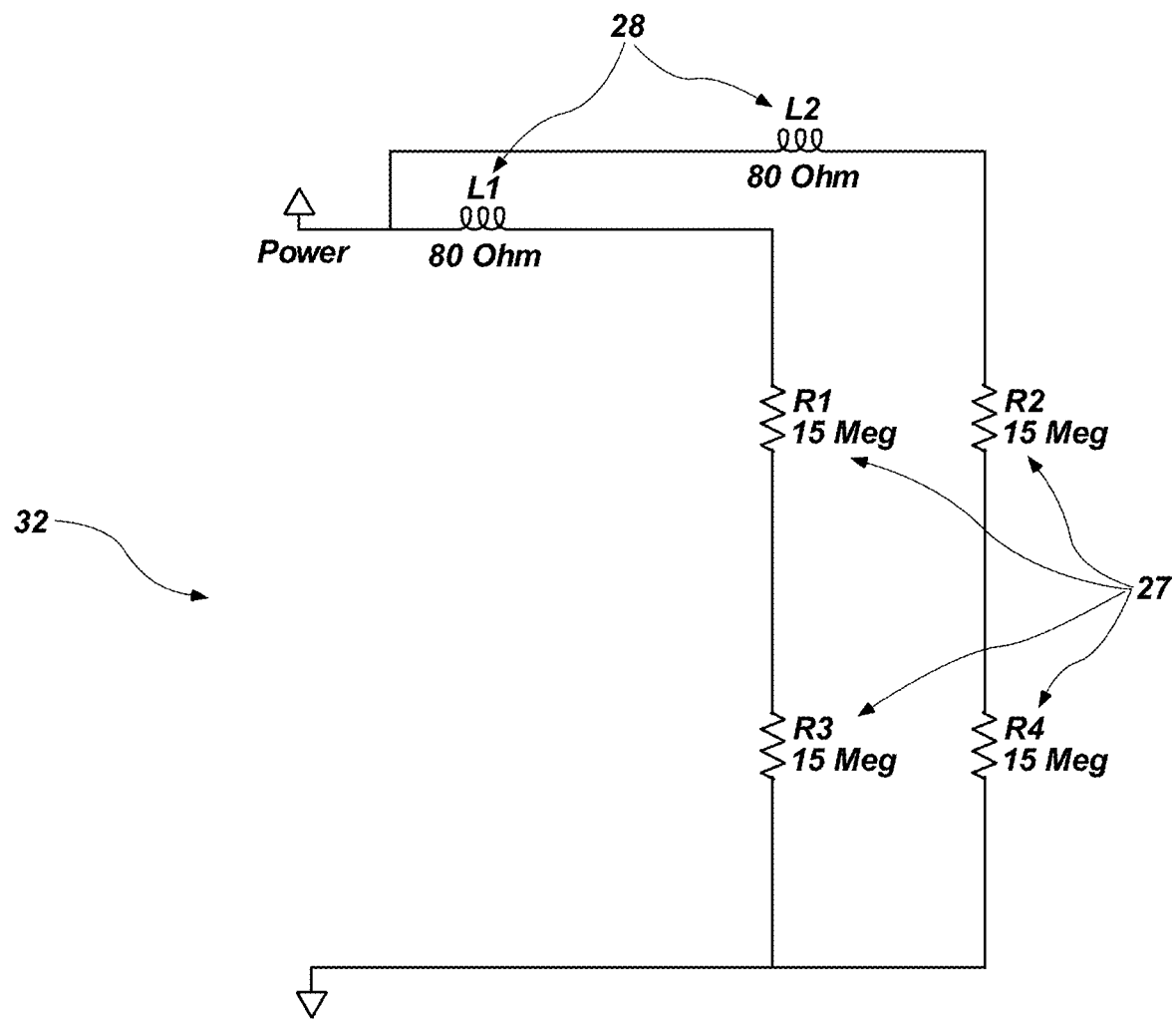
FIG. 3 is a diagram of a circuit of a passive electrostatic discharge mitigation system, according to one or more embodiments.

FIG. 2 is a perspective diagram of a passive electrostatic discharge mitigation system 20 according to one embodiment. A circuit 32, as shown in FIG. 3, of passive electrostatic discharge mitigation system 20 may be housed within a housing or box 24. Passive electrostatic discharge system 20 may be electrically connected to capture apparatus 23 or another portion of first spacecraft 10. Passive electrostatic discharge system 20 may also be electrically connected to a first electrical contact apparatus 25. First electrical contact apparatus 25 may include one or more compliant members (e.g., whiskers 26). Whiskers 26 comprise an electrically conductive material. Whiskers 26 may be comprised at least in part of beryllium copper.

FIG. 3 is a diagram of a circuit 32 of a passive electrostatic discharge mitigation system 20 according to one embodiment. Passive electrostatic discharge mitigation system 20 may be configured as a resistance inductance, or RL, circuit comprising one or more resistive elements 27 and one or more inductive elements 28. In some embodiments, the one or more inductive elements 28 may be an inductor, or one or more ferrite beads, one or more chokes, or another inductive element. The one or more resistive elements 27 may be one or more resistors and, in some embodiments, may be configured to provide a resistance of more than 1 megaohm and, in some embodiments, may be configured to provide a resistance of greater than or equal to 15 megaohms. When first spacecraft 10 and second spacecraft 11 make contact or come in close enough proximity for a static electric arc to occur between the first spacecraft 10 and second spacecraft 11, the passive electrostatic discharge mitigation system 20 provides an equalization path for the voltage differential between the two spacecraft and allows the different static charges to equalize.

As a result of the passive electrostatic discharge mitigation system 20, static voltage differential between the two spacecraft 10, 11 may be converted into heat to remove energy. This dissipation will reduce, or in some instances eliminate, electrostatic discharges and the amplitude and rise time of any associated voltage spikes that may be detrimental to either spacecraft. In some embodiments, the voltage differential may be discharged over a period of time, for example 50-90 nanoseconds or more. In some embodiments, discharge current may be reduced below 800 milliamps by passive electrostatic discharge mitigation system 20. According to certain embodiments, the one or more inductive elements 28 and one or more resistive elements 27 may be selected to accommodate a transient static potential difference between first spacecraft 10 and second spacecraft 11 of up to or more than 10 kilovolts. In some embodiments, the passive electrostatic discharge mitigation system 20 may be configured to have parallel circuit paths that may mitigate the risk of individual component failures.

Figure 4:
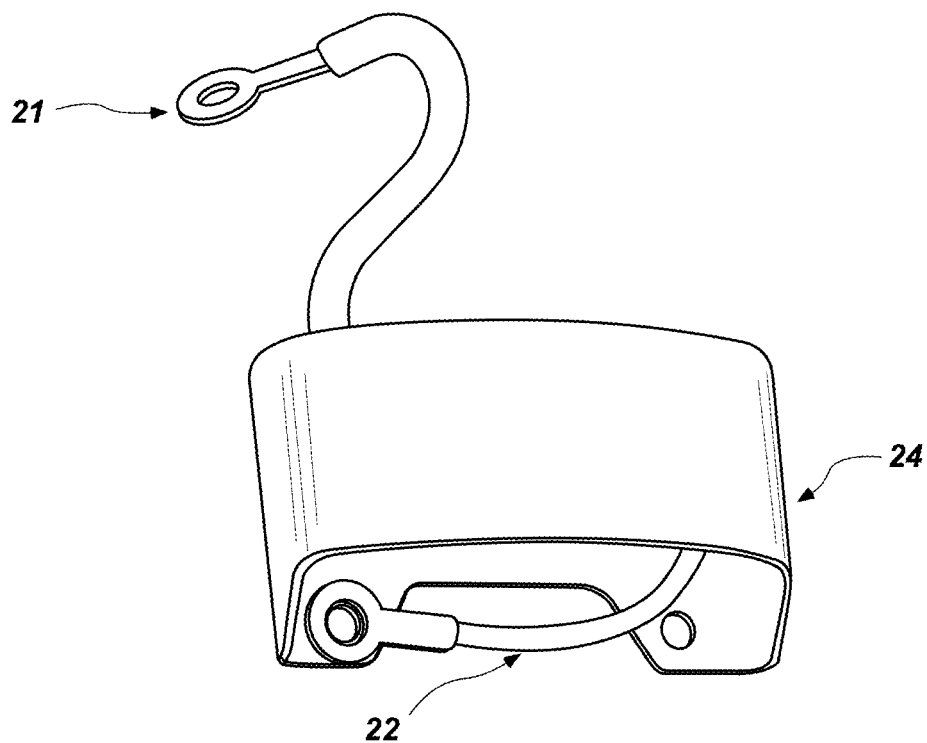
FIG. 4 is a perspective view of a housing for a passive electrostatic discharge mitigation system, according to one or more embodiments.

FIG. 4 is a perspective view of a housing 24 for a passive electrostatic discharge mitigation system 20 (FIG. 2). Insulated conductor 21 provides electrical connection between the passive electrostatic discharge mitigation system 20 and at least one first electrical contact apparatus 25 (FIG. 2), wherein first electrical contact apparatus 25 may comprise a compliant member which may be in the form of whisker 26 (FIG. 2). Insulated grounding conductor 22 provides electrical connection between the passive electrostatic discharge mitigation system 20 and capture apparatus 23 (FIG. 2) or elsewhere on a body of first spacecraft 10 (FIG. 1).

Figure 5:
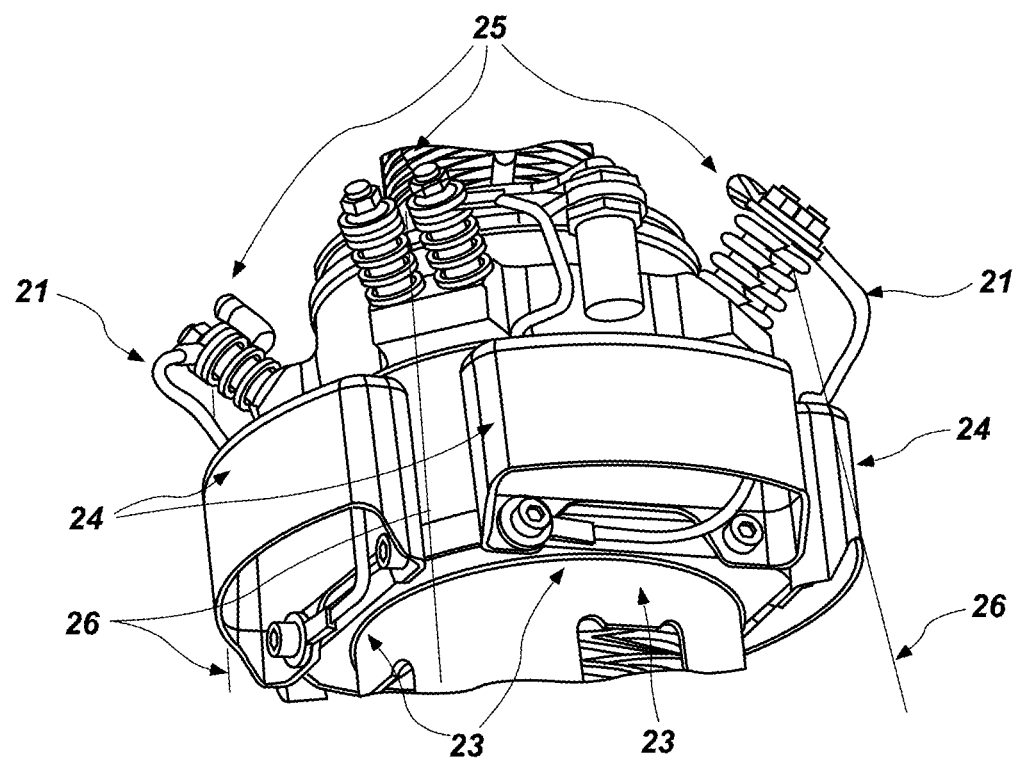
FIG. 5 is a perspective view of a housing for a passive electrostatic discharge mitigation system mounted on a capture apparatus, according to one or more embodiments.

FIG. 5 is a perspective view of a housing 24 for a passive electrostatic discharge mitigation system 20 (FIG. 2) mounted to capture apparatus 23. Insulated conductor 21 provides electrical connection between the passive electrostatic discharge mitigation system 20 and at least one first electrical contact apparatus 25, wherein first electrical contact apparatus 25 may comprise a compliant member such as whisker 26.

Figure 6:
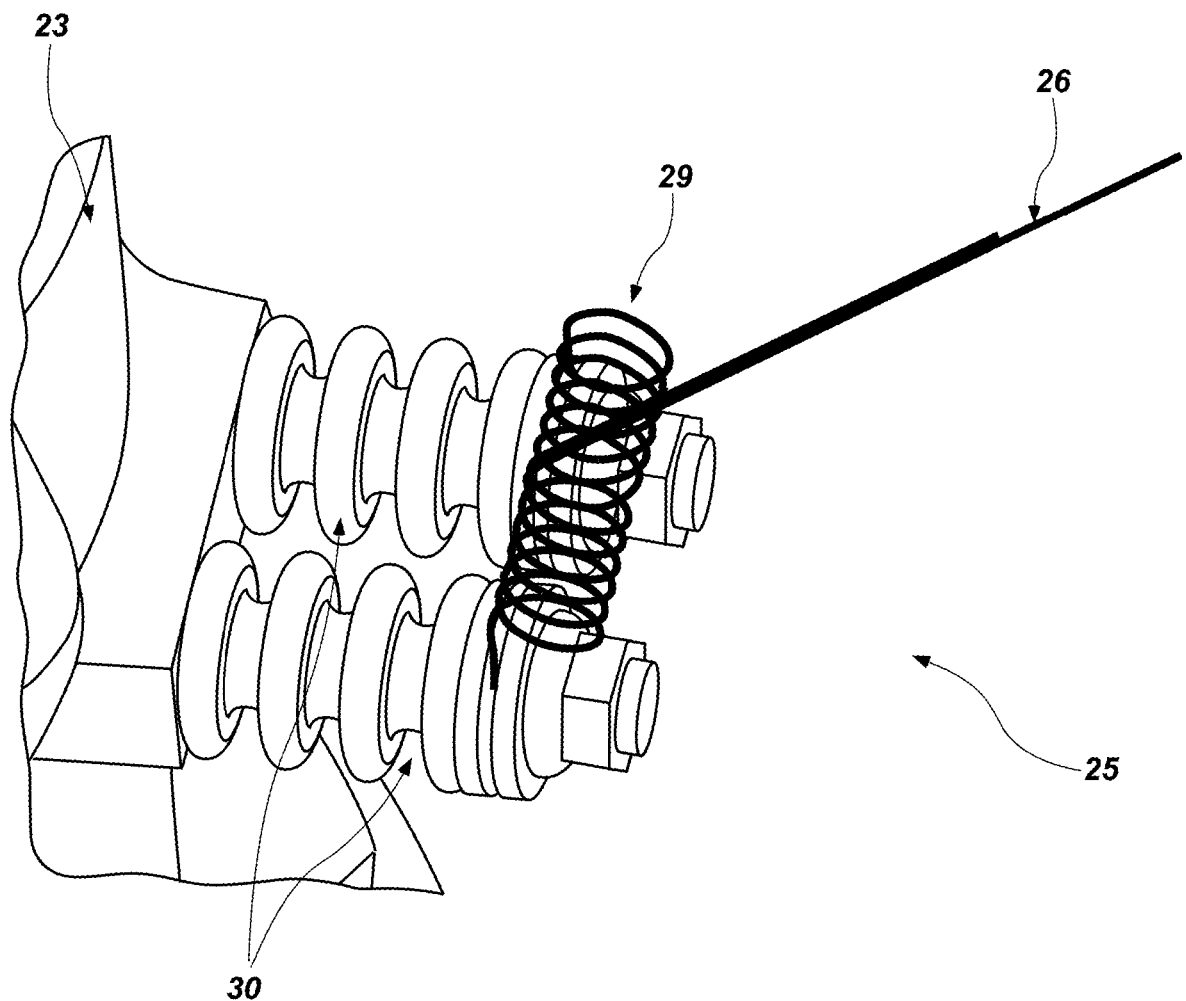
FIG. 6 is a perspective view of a first electrical contact apparatus, according to one or more embodiments.

FIG. 6 is a perspective view of first electrical contact apparatus 25. First electrical contact apparatus 25 may include one or more compliant members such as whiskers 26. Whiskers 26 may comprise a spring element 29 that may increase compliance of whiskers 26. Spring element 29 may be a torsion spring. Spring element 29 may allow whiskers 26 to move in a substantially rotational manner when whiskers 26 contact engine 19 (FIG. 1) or another physical structure on the second spacecraft 11 (FIG. 1). First electrical contact apparatus 25 may be designed to be electrically isolated from capture apparatus 23, for example, by one or more insulated posts 30 that electrically isolate the conductive components, such as the whiskers 26, from the capture apparatus 23. Insulated posts 30 may be comprised of a machinable glass ceramic or other insulating material sufficient to electrically isolate the conductive components. In some embodiments, the conductive components of first electrical contact apparatus 25 may be positioned 0.25 inch or more from the closest conductive component of capture apparatus 23, or another suitable distance to prevent charge creep or arcing.

Figure 7:
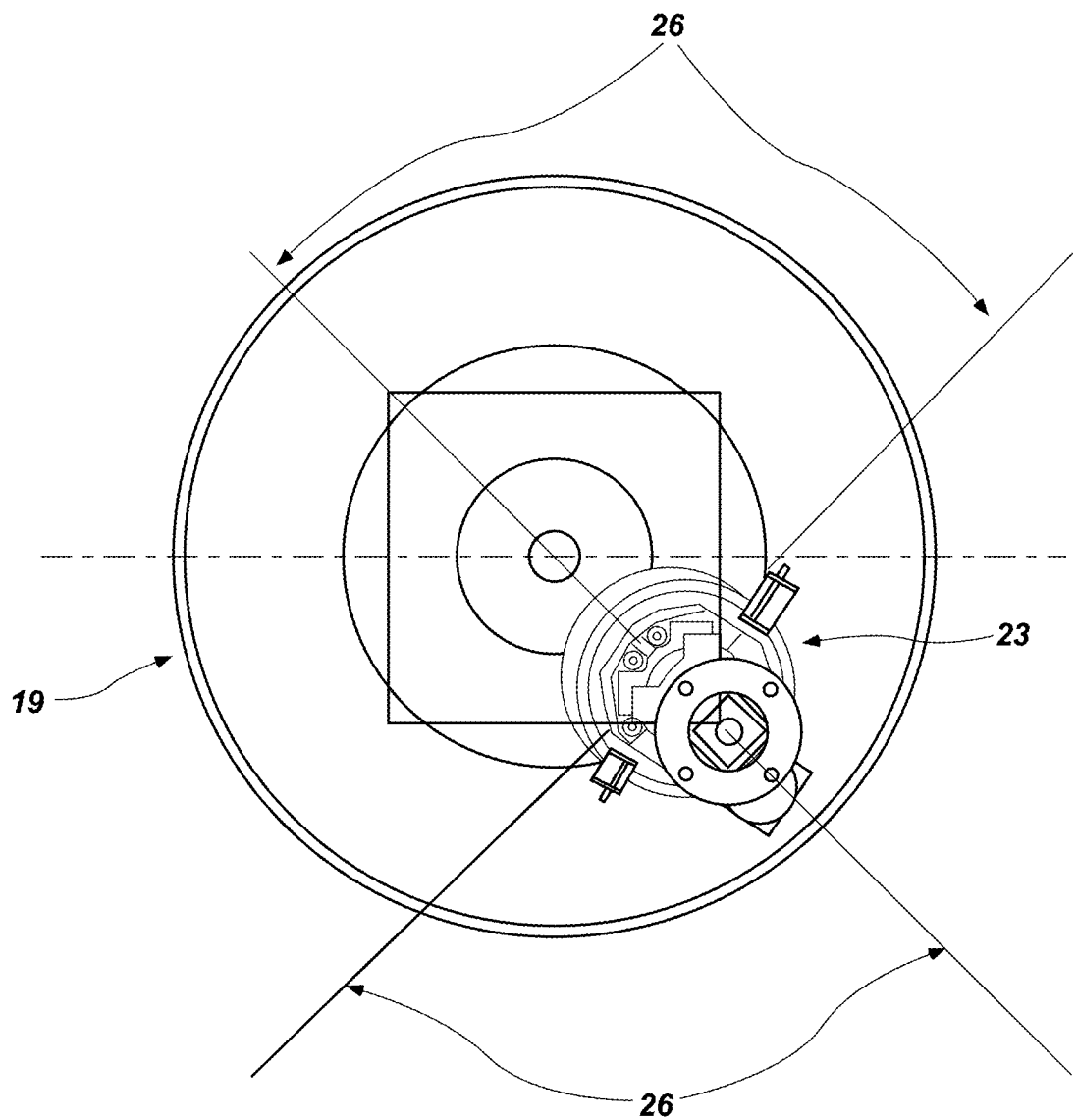
FIG. 7 is a perspective view of a capture apparatus with a passive electrostatic discharge mitigation system mounted thereon approaching an engine of a second spacecraft, according to one or more embodiments.

FIG. 7 is a perspective view of a capture apparatus 23 with a passive electrostatic discharge mitigation system 20 mounted thereon approaching the engine 19 of the second spacecraft 11. Whiskers 26 may be designed to be of a sufficient length to ensure that at least one whisker 26 provides the first point of physical contact between first spacecraft 10 and second spacecraft 11. Whiskers 26 may be designed to be of a sufficient length to ensure that at least one whisker 26 is the only physical structure on the first spacecraft 10 to come within a distance that would allow a static electric arc between first spacecraft 10 and second spacecraft 11 before any portion of first spacecraft 10 physically contacts second spacecraft 11. In some embodiments, whiskers 26 may be at least 6 inches in length.

Figure 8:
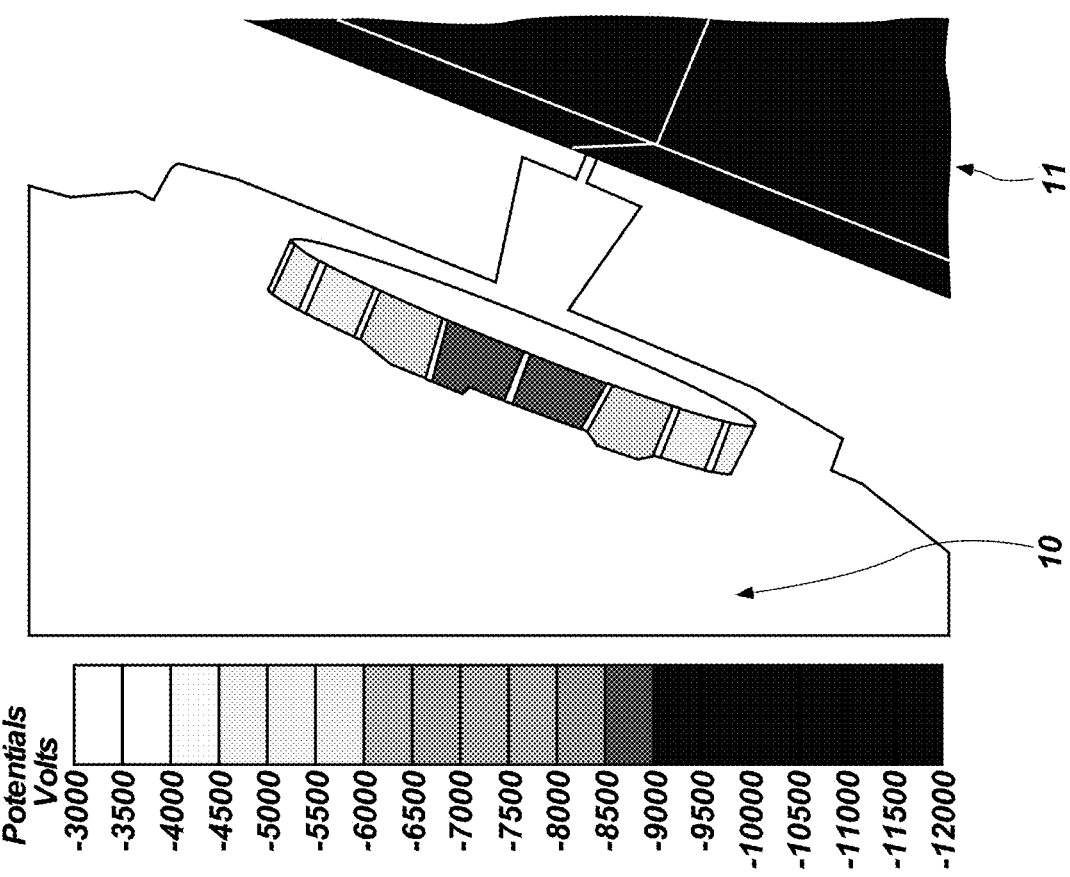
FIG. 8 is a graphical representation of a sample anticipated static potential difference between portions of a first spacecraft and a second spacecraft, according to one or more embodiments.
Figure 8:
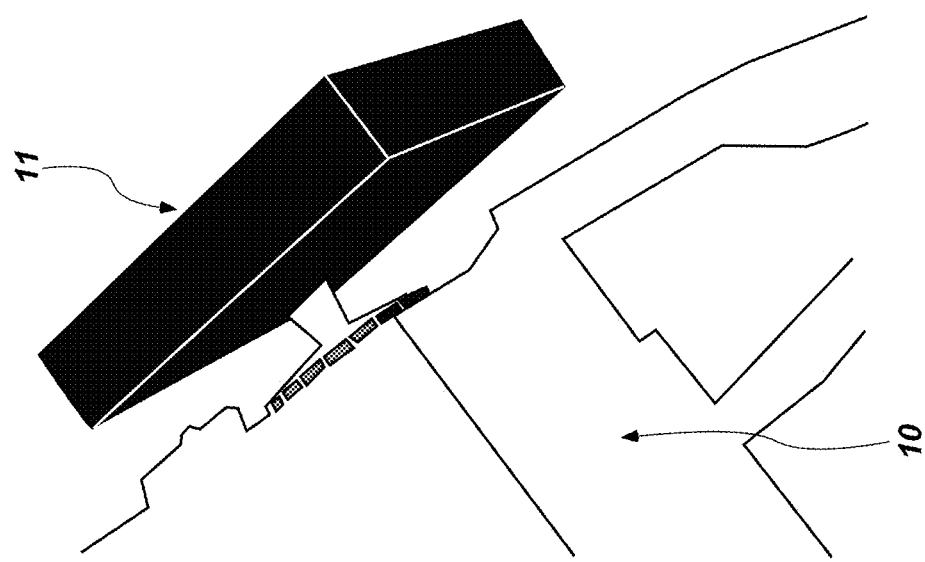

FIG. 8 depicts charge potential differentials of a first spacecraft in relation to a second spacecraft for use with an active electrostatic discharge mitigation system, according to one embodiment. FIG. 8 graphically represents sample anticipated static potential, or charge, differences between various portions of first spacecraft 10 and second spacecraft 11. In some embodiments, static potential differences may be on the order of 10 kilovolts or more and capacitance between the vehicles may be on the order of 100 picofarads or more.

Figure 9B:
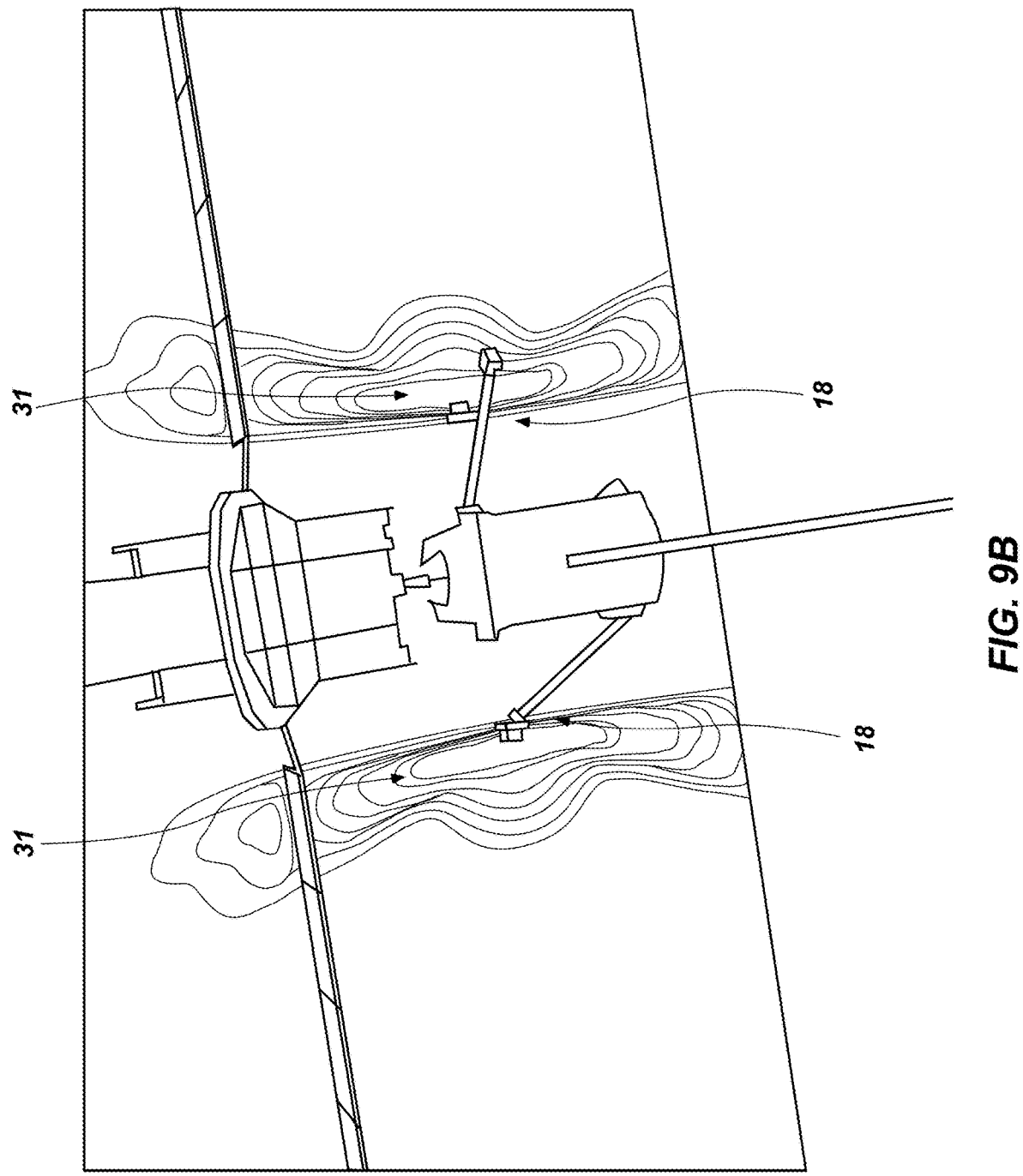

FIGS. 9A and 9B depict an active electrostatic discharge mitigation system 31 using plasma. In some embodiments, the active electrostatic discharge mitigation system 31 may create a plasma field that can engulf both the first spacecraft 10 and the second spacecraft 11. In some embodiments, the active electrostatic discharge mitigation system 31 creates the plasma field using one or more electric propulsion engines of first spacecraft 10, which may be main thruster 17, one or more gimbaled thrusters 18, both, or another engine. The one or more electric propulsion engines may be Hall Effect Thrusters. The plasma field created by the active electrostatic discharge mitigation system 31 may be low temperature plasma. Active electrostatic discharge mitigation system 31 can be operated to reduce the static potential measured to ground reference of each of first spacecraft 10 and second spacecraft 11. The reduction of static potential differential between first spacecraft 10 and second spacecraft 11 may be to a level less than about 5 kilovolts, less than about 1 kilovolt, less than about 200 volts, or less than about 100 volts in various embodiments. In addition, use of the active electrostatic discharge mitigation system 31 may reduce potential ground bounce between the first spacecraft 10 and second spacecraft 11.

In some embodiments, the first spacecraft 10 may have both a passive electrostatic discharge mitigation system 20 and an active electrostatic discharge mitigation system 31. In such embodiments, active electrostatic discharge mitigation system 31 may reduce differential static potential between first spacecraft 10 and second spacecraft 11 before contact, and passive electrostatic discharge mitigation system 20 to mitigate remaining differential static potential between first spacecraft 10 and second spacecraft 11 upon contact or approach sufficient to permit electrostatic arcing. In such embodiments, passive electrostatic discharge mitigation system 20 and active electrostatic discharge mitigation system 31 provide redundancy upon component failure of either system.

Further example embodiments are disclosed below.

Embodiment 1

A system for mitigating electrostatic discharge between a first space vehicle and a second space vehicle comprising a passive electrostatic discharge mitigation system situated on the first space vehicle, wherein the passive electrostatic discharge mitigation system comprises one or more resistors.

Embodiment 2

The system of Embodiment 1, wherein the passive electrostatic discharge mitigation system reduces an electrostatic discharge current between the first space vehicle and the second space vehicle to less than or equal to about 800 milliamps over a time period of less than or equal to about 90 nanoseconds.

Embodiment 3

The system of Embodiment 1, wherein the passive electrostatic discharge mitigation system further comprises one or more inductive elements selected from the group comprising inductors, ferrite beads, and chokes.

Embodiment 4

The system of Embodiment 1, wherein the system further includes one or more whiskers.

Embodiment 5

A system for mitigating electrostatic discharge between a first space vehicle and a second space vehicle comprising an active electrostatic discharge system situated on the first space vehicle, wherein the active electrostatic discharge system manipulates a plasma field.

Embodiment 6

The system of Embodiment 5, wherein the plasma field is the plasma field of the first space vehicle.

Embodiment 7

The system of Embodiment 5, wherein the plasma field is the plasma field of the second space vehicle.

Embodiment 8

The system of Embodiment 5, wherein the active electrostatic discharge system manipulates the plasma field using an electric propulsion apparatus.

Embodiment 9

The system of Embodiment 8, wherein the electric propulsion apparatus produces a plasma field significant enough to reduce the potential between the first space vehicle and the second space vehicle to less than about +/−200 volts.

Embodiment 10

The system of Embodiment 8, wherein the electric propulsion apparatus is one or more Hall Effect Thrusters.

Embodiment 11

A system for mitigating electrostatic discharge between a first space vehicle and a second space vehicle, comprising: a propulsion mechanism for maneuvering the first space vehicle in space; a capture mechanism positioned on the first space vehicle for at least temporarily joining the first space vehicle to the second space vehicle; and a mechanism for passively mitigating electrostatic discharge.

Embodiment 12

The system of Embodiment 11, wherein the mechanism for passively mitigating electrostatic discharge includes one or more whiskers.

Embodiment 13

The system of Embodiment 12, wherein the whisker provides the first physical contact between the first space vehicle and the second space vehicle.

Embodiment 14

The system of Embodiment 13, wherein the whisker contacts an engine of the second space vehicle.

Embodiment 15

The system of Embodiment 14, wherein the whisker always contacts the engine before any other physical structure on the second space vehicle.

Embodiment 16

The system of Embodiment 15, wherein the engine is a liquid apogee engine.

Embodiment 17

The system of Embodiment 12, wherein the capture mechanism includes a probe.

Embodiment 18

The system of Embodiment 17, wherein the whisker is positioned on the probe.

Embodiment 19

The system of Embodiment 13, wherein there are a plurality of whiskers.

Embodiment 20

The system of Embodiment 13, wherein the whisker extends from the first space vehicle in a direction toward the second space vehicle.

Embodiment 21

The system of Embodiment 13, wherein the whisker is highly compliant.

Embodiment 22

The system of Embodiment 21, wherein the compliance is provided in part by a torsion spring.

Embodiment 23

The system of Embodiment 13, wherein the whisker is comprised of beryllium copper.

Embodiment 24

A method for mitigating electrostatic discharge between a first space vehicle and a second space vehicle comprising: providing a passive electrostatic discharge mitigation system on the first space vehicle, wherein the passive electrostatic discharge mitigation system comprises one or more resistors; and configuring the first contact between the first space vehicle and the second space vehicle to ensure that any electrostatic discharge between the first space vehicle and the second space vehicle is directed through the passive electrostatic discharge mitigation system.

Embodiment 25

The method of Embodiment 24, wherein the method further comprises reducing an electrostatic discharge current between the first space vehicle and the second space vehicle to less than or equal to about 800 milliamps over a time period of less than or equal to about 90 nanoseconds using the passive electrostatic discharge mitigation system.

Embodiment 26

The method of Embodiment 24, wherein the passive electrostatic discharge mitigation system further comprises one or more inductive elements selected from the group comprising inductors, ferrite beads, and chokes.

Embodiment 27

The method of Embodiment 24, wherein the passive electrostatic discharge mitigation system further includes one or more whiskers.

Embodiment 28

A method for mitigating electrostatic discharge between a first space vehicle and a second space vehicle comprising: providing an active electrostatic discharge system situated on the first space vehicle; and manipulating a plasma field using the active electrostatic discharge system.

Embodiment 29

The method of Embodiment 28, wherein the manipulating of the plasma field comprises manipulating the plasma field of the first space vehicle.

Embodiment 30

The method of Embodiment 28, wherein the manipulating of the plasma field comprises manipulating the plasma field of the second space vehicle.

Embodiment 31

The method of Embodiment 28, wherein the manipulating of the plasma field comprises manipulating the plasma field using an electric propulsion apparatus.

Embodiment 32

The method of Embodiment 31, wherein the method further comprises producing a plasma field significant enough to reduce the potential between the first space vehicle and the second space vehicle to less than about +/−200 volts using the electric propulsion apparatus.

Embodiment 33

The method of Embodiment 31, wherein the electric propulsion apparatus is one or more Hall Effect Thrusters.

Embodiment 34

A method for mitigating electrostatic discharge between a first space vehicle and a second space vehicle, comprising: providing a capture mechanism positioned on the first space vehicle for at least temporarily joining the first space vehicle to the second space vehicle; maneuvering the first space vehicle in space in proximity to the second space vehicle; and providing a mechanism for passively mitigating electrostatic discharge between the first space vehicle and the second space vehicle.

Embodiment 35

The method of Embodiment 34, wherein the mechanism for passively mitigating electrostatic discharge includes a whisker.

Embodiment 36

The method of Embodiment 35, wherein the method further includes physically contacting the first space vehicle and the second space vehicle, wherein the whisker provides the first physical contact between the first space vehicle and the second space vehicle.

Embodiment 37

The method of Embodiment 36, wherein the whisker contacts an engine of the second space vehicle.

Embodiment 38

The method of Embodiment 37, wherein the whisker always contacts the engine before any other physical structure on the second space vehicle.

Embodiment 39

The method of Embodiment 38, wherein the engine is a liquid apogee engine.

Embodiment 40

The method of Embodiment 35, wherein the capture mechanism includes a probe.

Embodiment 41

The method of Embodiment 40, wherein the whisker is positioned on the probe.

Embodiment 42

The method of Embodiment 36, wherein there are a plurality of whiskers.

Embodiment 43

The method of Embodiment 36, wherein the whisker extends from the first space vehicle in a direction toward the second space vehicle.

Embodiment 44

The method of Embodiment 36, wherein the whisker is highly compliant.

Embodiment 45

The method of Embodiment 44, wherein the compliance is provided in part by a torsion spring.

Embodiment 46

The method of Embodiment 36, wherein the whisker is comprised of beryllium copper.

Embodiment 47

A system for mitigating electrostatic discharge between a first space vehicle and a second space vehicle comprising: a passive electrostatic discharge mitigation system situated on the first space vehicle, wherein the passive electrostatic discharge mitigation system comprises one or more resistors; and an active electrostatic discharge system situated on the first space vehicle, wherein the active electrostatic discharge system manipulates a plasma field.

Embodiment 48

The system of Embodiment 47, wherein the passive electrostatic discharge mitigation system reduces an electrostatic discharge current between the first space vehicle and the second space vehicle to less than or equal to about 800 milliamps over a time period of less than or equal to about 90 nanoseconds.

Embodiment 49

The system of Embodiment 47, wherein the passive electrostatic discharge mitigation system further comprises one or more inductive elements selected from the group comprising inductors, ferrite beads, and chokes.

Embodiment 50

The system of Embodiment 47, wherein the system further includes one or more whiskers.

Embodiment 51

The system of Embodiment 47, wherein the plasma field is the plasma field of the first space vehicle.

Embodiment 52

The system of Embodiment 47, wherein the plasma field is the plasma field of the second space vehicle.

Embodiment 53

The system of Embodiment 47, wherein the active electrostatic discharge system manipulates the plasma field using an electric propulsion apparatus.

Embodiment 54

The system of Embodiment 53, wherein the electric propulsion apparatus produces a plasma field significant enough to reduce the potential between the first space vehicle and the second space vehicle to less than about +/−200 volts.

Embodiment 55

The system of Embodiment 53, wherein the electric propulsion apparatus is one or more Hall Effect Thrusters.

Embodiment 56

The system of Embodiment 49, wherein the whisker provides the first physical contact between the first space vehicle and the second space vehicle.

Embodiment 57

The system of Embodiment 56, wherein the whisker contacts an engine of the second space vehicle.

Embodiment 58

The system of Embodiment 57, wherein the whisker always contacts the engine before any other physical structure on the second space vehicle.

Embodiment 59

The system of Embodiment 49, wherein a capture mechanism includes a probe.

Embodiment 60

The system of Embodiment 59, wherein the whisker is positioned on the probe.

Embodiment 61

The system of Embodiment 60, wherein there are a plurality of whiskers.

Embodiment 62

The system of Embodiment 60, wherein the whisker extends from the first space vehicle in a direction toward the second space vehicle.

Embodiment 63

The system of Embodiment 60, wherein the whisker is highly compliant.

Embodiment 64

The system of Embodiment 63, wherein the compliance is provided in part by a torsion spring.

Embodiment 65

The system of Embodiment 60, wherein the whisker is comprised of beryllium copper.

Embodiment 66

A method for mitigating electrostatic discharge between a first space vehicle and a second space vehicle comprising: providing an active electrostatic discharge system situated on the first space vehicle; manipulating a plasma field using the active electrostatic discharge system; providing a passive electrostatic discharge mitigation system on the first space vehicle, wherein the passive electrostatic discharge mitigation system comprises one or more resistors; and configuring the first contact between the first space vehicle and the second space vehicle to ensure that any electrostatic discharge between the first space vehicle and the second space vehicle is directed through the passive electrostatic discharge mitigation system.

Embodiment 67

The method of Embodiment 66, wherein the method further comprises reducing an electrostatic discharge current between the first space vehicle and the second space vehicle to less than or equal to about 800 milliamps over a time period of less than or equal to about 90 nanoseconds using the passive electrostatic discharge mitigation system.

Embodiment 68

The method of Embodiment 66, wherein the passive electrostatic discharge mitigation system further comprises one or more inductive elements selected from the group comprising inductors, ferrite beads, and chokes.

Embodiment 69

The method of Embodiment 66, wherein the passive electrostatic discharge mitigation system further includes one or more whiskers.

Embodiment 70

The method of Embodiment 66, wherein the manipulating of the plasma field comprises manipulating the plasma field of the first space vehicle.

Embodiment 71

The method of Embodiment 66, wherein the manipulating of the plasma field comprises manipulating the plasma field of the second space vehicle.

Embodiment 72

The method of Embodiment 66, wherein the manipulating of the plasma field comprises manipulating the plasma field using an electric propulsion apparatus.

Embodiment 73

The method of Embodiment 72, wherein the method further comprises producing a plasma field significant enough to reduce the potential between the first space vehicle and the second space vehicle to less than about +/−200 volts using the electric propulsion apparatus.

Embodiment 74

The method of Embodiment 72, wherein the electric propulsion apparatus is one or more Hall Effect Thrusters.

Embodiment 75

The method of Embodiment 69, wherein the method further includes physically contacting the first space vehicle and the second space vehicle, wherein the whisker provides the first physical contact between the first space vehicle and the second space vehicle.

Embodiment 76

The method of Embodiment 75, wherein the whisker contacts an engine of the second space vehicle.

Embodiment 77

The method of Embodiment 76, wherein the whisker always contacts the engine before any other physical structure on the second space vehicle.

Embodiment 78

The method of Embodiment 76, wherein the engine is a liquid apogee engine.

Embodiment 79

The method of Embodiment 68, wherein a capture mechanism includes a probe.

Embodiment 80

The method of Embodiment 79, wherein the whisker is positioned on the probe.

Embodiment 81

The method of Embodiment 80, wherein the whisker extends from the first space vehicle in a direction toward the second space vehicle.

Embodiment 82

The method of Embodiment 69, wherein the whisker is highly compliant.

Embodiment 83

The method of Embodiment 82, wherein the compliance is provided in part by a torsion spring.

Embodiment 84

The method of Embodiment 69, wherein the whisker is comprised of beryllium copper.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternative useful combinations of the elements described, will become apparent to those skilled in the art from the description. Such modifications and embodiments also fall within the scope of the appended claims and equivalents. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for mitigating electrostatic discharge between a first space vehicle and a second space vehicle, the system comprising:
   a propulsion mechanism for maneuvering the first space vehicle in space;
   a capture mechanism to be positioned on the first space vehicle for at least temporarily joining the first space vehicle to the second space vehicle; and
   a mechanism for passively mitigating electrostatic discharge comprising one or more resistors and one or more compliant members electrically connected to the one or more resistors, the one or more compliant members comprising a non-dielectric material;
      wherein the one or more compliant members are configured such that one of the one or more compliant members provides first physical contact between the first space vehicle and the second space vehicle.

2. The system of claim 1, wherein the passive electrostatic discharge mitigation mechanism further comprises one or more inductive elements comprising inductors, ferrite beads, or chokes.

3. The system of claim 1, wherein the one or more compliant members are electrically isolated from the capture mechanism.

4. The system of claim 3, further comprising one or more insulated posts for electrically isolating the one or more compliant members from the capture mechanism.

5. The system of claim 1, wherein the one or more compliant members are configured to extend from the first space vehicle in a direction toward the second space vehicle.

6. The system of claim 5, wherein the one or more compliant members are whiskers.

7. The system of claim 6, wherein compliance of the one or more compliant members is provided, at least in part, by a torsion spring.

8. A system for mitigating electrostatic discharge between a first space vehicle and a second space vehicle, the system comprising:
   a propulsion mechanism for maneuvering the first space vehicle in space;
   a capture mechanism to be positioned the first space vehicle for at least temporarily joining the first space vehicle to the second space vehicle; and
   a mechanism for passively mitigating electrostatic discharge comprising one or more resistors and one or more compliant members electrically connected to the one or more resistors,
      wherein the one or more compliant members are configured such that one of the one or more compliant members provides first physical contact between the first space vehicle and the second space vehicle, and
      wherein the passive electrostatic discharge mitigation mechanism is configured to reduce an electrostatic discharge current between the first space vehicle and the second space vehicle to less than or equal to substantially 800 milliamps over a time period of less than or equal to substantially 90 nanoseconds.

9. A system for mitigating electrostatic discharge between a first space vehicle and a second space vehicle, the system comprising:
   an active electrostatic discharge system situated on the first space vehicle, wherein the active electrostatic discharge system is configured to use an electric propulsion apparatus on the first space vehicle to reduce an electric potential between the first space vehicle and the second space vehicle by engulfing the first space vehicle, the second space vehicle, or both the first space vehicle and the second space vehicle with a plasma field.

10. The system of claim 9, wherein the active electrostatic discharge system is configured to manipulate the plasma field of the first space vehicle.

11. The system of claim 9, wherein the active electrostatic discharge system is configured to manipulate the plasma field of the second space vehicle.

12. The system of claim 9, wherein the electric propulsion apparatus is configured to produce a plasma field significant enough to reduce the potential between the first space vehicle and the second space vehicle to less than substantially +/−200 volts.

13. The system of claim 9, wherein the electric propulsion apparatus is one or more Hall Effect Thrusters.

14. A system on a first space vehicle for mitigating electrostatic discharge between the first space vehicle and a second space vehicle, the system comprising:
   an active electrostatic discharge system situated on the first space vehicle, wherein the active electrostatic discharge system is configured to use an electric propulsion apparatus on the first space vehicle to reduce an electric potential between the first space vehicle and the second space vehicle before contact by manipulating a plasma field of one of the first space vehicle, the second space vehicle, or both the first and second space vehicle; and a passive electrostatic discharge mitigation system situated on the first space vehicle, wherein the passive electrostatic discharge mitigation system comprises one or more resistors and one or more compliant members electrically connected to the one or more resistors, the one or more compliant members comprising a nonelectrically insulative material, wherein the passive electrostatic discharge mitigation system is configured to mitigate remaining electric potential between the first space vehicle and the second space vehicle upon contact.

15. The system of claim 14, wherein the passive electrostatic discharge mitigation system is configured to reduce an electrostatic discharge current between the first space vehicle and the second space vehicle to less than or equal to substantially 800 milliamps over a time period of less than or equal to substantially 90 nanoseconds.

16. The system of claim 14, wherein the active electrostatic discharge system is configured to manipulate the plasma field of the first space vehicle.

17. The system of claim 14, wherein the active electrostatic discharge system is configured to manipulate the plasma field of the second space vehicle.

18. The system of claim 14, wherein the electric propulsion apparatus is configured to produce a plasma field significant enough to reduce the potential between the first space vehicle and the second space vehicle to less than substantially +/−200 volts.

19. The system of claim 14, wherein the one or more compliant members are configured to provide first physical contact between the first space vehicle and the second space vehicle.

20. The system of claim 14, wherein the one or more compliant members are configured to extend from the first space vehicle in a direction toward the second space vehicle.

* * * * *